United States Patent
Ro et al.

(10) Patent No.: US 12,282,517 B2
(45) Date of Patent: Apr. 22, 2025

(54) MEMORY SYSTEM USING HETEROGENEOUS DATA FORMAT AND METHOD OF CONTROLLING THE SAME

(71) Applicant: UIF (University Industry Foundation), Yonsei University, Seoul (KR)

(72) Inventors: Won Woo Ro, Seoul (KR); Chanyoung Yoo, Seoul (KR); Hongju Kal, Seoul (KR)

(73) Assignee: UIF (University Industry Foundation), Yonsei University, Seoul (KR)

( * ) Notice: Subject to any disclaimer, the term of this patent is extended or adjusted under 35 U.S.C. 154(b) by 195 days.

(21) Appl. No.: 18/088,629

(22) Filed: Dec. 26, 2022

(65) Prior Publication Data

US 2023/0259564 A1 Aug. 17, 2023

(30) Foreign Application Priority Data

Feb. 14, 2022 (KR) .......................... 10-2022-0018871

(51) Int. Cl.
*G06F 16/95* (2019.01)
*G06F 16/9535* (2019.01)
*G06N 3/08* (2023.01)

(52) U.S. Cl.
CPC .......... *G06F 16/9535* (2019.01); *G06N 3/08* (2013.01)

(58) Field of Classification Search
CPC ............. G06F 16/9535; G06F 16/9536; G06F 16/9538
See application file for complete search history.

(56) References Cited

U.S. PATENT DOCUMENTS

| | | | |
|---|---|---|---|
| 2009/0228635 A1 | 9/2009 | Borkenhagen | |
| 2014/0282586 A1* | 9/2014 | Shear | H04L 47/70 718/104 |
| 2022/0035684 A1* | 2/2022 | Gupte | G06F 9/5083 |
| 2023/0300532 A1* | 9/2023 | Spittle | G06F 3/165 381/1 |

FOREIGN PATENT DOCUMENTS

| | | |
|---|---|---|
| KR | 10-1150162 B1 | 6/2012 |
| KR | 10-2020-0070088 A | 6/2020 |
| KR | 10-2021-0014793 A | 2/2021 |
| KR | 10-2021-0015524 A | 2/2021 |
| KR | 10-2021-0028393 A | 3/2021 |

OTHER PUBLICATIONS

Heesu Kim, et al., "GradPIM: A Practical Processing-in-DRAM Architecture for Gradient Descent", 2021 IEEE International Symposium on High-Performance Computer Architecture (HPCA), pp. 249~262.

* cited by examiner

*Primary Examiner* — Merilyn P Nguyen
(74) *Attorney, Agent, or Firm* — Park, Kim & Suh, LLC

(57) ABSTRACT

Disclosed is a memory system using a heterogeneous data format, which provides a personalized recommendation algorithm function to an internet service user based on a plurality of items, which includes a user preference analyzer for each item that calculates a user preference value corresponding to each item of a analysis target service; and a memory that stores data related to the each item in a first data format or stores data related to the each item in a second data format with required bits less than the first data format, based on the user preference value of the each item.

16 Claims, 7 Drawing Sheets

FP32

BFLOAT16

MEMORY SYSTEM USING HETEROGENEOUS DATA FORMAT AND METHOD OF CONTROLLING THE SAME

CROSS-REFERENCE TO RELATED APPLICATIONS

A claim for priority under 35 U.S.C. § 119 is made to Korean Patent Application No. 10-2022-0018871, filed on Feb. 14, 2022, in the Korean Intellectual Property Office, the entire contents of which are hereby incorporated by reference.

BACKGROUND

Embodiments of the inventive concept described herein relate to a memory system using a heterogeneous data format capable of improving performance compared to conventional memory systems by reducing the size of an embedding table, and a method of controlling the memory system using the heterogeneous data format.

The inventive concept derived from research conducted as part of an information communication broadcasting research and development project (Project identification number: 1711134555, task number: 2021-0-00853, Research task title: Developing Software Platform for Programming of PIM, Task management institution: Institute of Information & communications Technology Planning & Evaluation (IITP), Research period: 2021.04.01.-2022.12.31.) of South Korea's Ministry of Science and ICT. Meanwhile, there is no property interest of the Korean government in any aspect of the inventive concept.

Recently, artificial intelligence of personalized recommendation algorithms provided by various Internet services mainly utilizes an embedding layer.

This embedding layer is greatly affected by a memory bandwidth. In detail, millions of items are stored in one embedding table to perform an embedding operation, and high bandwidth is required in the process of providing these items to a host processor. Meanwhile, an NMP (Near Memory Processing) or a PIM (Processing In Memory) is being used as a solution to these limitations.

When the NMP is performed using a high-bandwidth memory (HBM), which is widely used in applications requiring high bandwidth, high-throughput calculation is possible, and thus a personalized recommendation system can be accelerated effectively.

However, since the HBM has a limited capacity compared to conventional memory devices, it is difficult to store an embedding table including millions of items in one stack.

Therefore, a memory system capable of effectively storing an embedding table even with a limited capacity is required.

SUMMARY

Embodiments of the inventive concept provide a memory system using a heterogeneous data format, capable of obtaining a high performance gain compared to a conventional DIMM-based NMP structure by reducing the size of an embedding table and enabling a 3D stacked memory-based NMP, and a method of controlling the memory system using the heterogeneous data format.

In addition, embodiments of the inventive concept provide a memory system using a heterogeneous data format, capable of utilizing a three-dimensional stacked memory that enables rapid utilization of the NMP and the PIM even in a new type of application showing a similar pattern through algorithm reconstruction technology obtained through an NMP optimization and characteristics of algorithms related to personalized recommendation systems provided by Internet services, and a method of controlling the memory system using the heterogeneous data format.

According to an exemplary embodiment, a memory system using a heterogeneous data format, which provides a personalized recommendation algorithm function to an internet service user based on a plurality of items, which includes a user preference analyzer for each item that calculates a user preference value corresponding to each item of a analysis target service; and a memory that stores data related to the each item in a first data format or stores data related to the each item in a second data format with required bits less than the first data format, based on the user preference value of the each item.

According to an embodiment, the user preference analyzer for the each item may determine a value representing a frequency of using data related to any one item as the user preference value for a corresponding item when the memory system provides the personalized recommendation algorithm function.

According to an embodiment, the memory system may further include a service item classification unit that classifies items in which the corresponding user preference value among the each item of the analysis target service is equal to or greater than a reference preference value into a first group, and classifies items in which the corresponding user preference value among the each item of the analysis target service is less than the reference preference value into a second group; and a data format changing unit that changes a format of data previously stored in the first data format and related to an item belonging to the second group to the second data format.

According to an embodiment, the memory may store data related to the item belonging to the first group in the first data format; and may store data related to the item belonging to the second group in the second data format.

According to an embodiment, the memory system may further include an algorithm item extraction unit that extracts a plurality of items from the analysis target service by using an artificial intelligence model; an embedding table generating unit that generates an embedding table based on the extracted items; and a personalized recommendation unit that performs the personalized recommendation algorithm function of recommending personalized recommendation information to the internet service user using the artificial intelligence model based on the embedding table.

According to an embodiment, the algorithm item extraction unit may extract a plurality of learning items from a machine learning service using the artificial intelligence model, the embedding table generating unit may generate a learning embedding table based on the extracted learning items, and the memory system may further include a machine learning unit that trains the artificial intelligence model by setting the learning embedding table as an input variable and setting optimal personalized recommendation information as an output variable.

According to an embodiment, the algorithm item extraction unit may extract at least one feature of a genre of the analysis target service, a user age distribution, a user gender distribution, a user residence area, and a user propensity as the item of the analysis target service.

According to an embodiment, the algorithm item extraction unit may periodically extract the plurality of items from the analysis target service at regular intervals, the embedding table generating unit may update a pre-generated embedding table for learning based on an additionally extracted item, and the machine learning unit may additionally train the artificial intelligence model by setting the updated embedding table as an input variable and setting newly updated optimal personalized recommendation information as an output variable.

According to an embodiment, the memory may be implemented with a three-dimensional stacked memory.

According to an embodiment, the data format changing unit may change a format of data previously stored in the first data format of a 32-bit data format and related to the item belonging to the second group to the second data format of a 16-bit data format.

According to an exemplary embodiment, a method of controlling a memory system using a heterogeneous data format, which provides a personalized recommendation algorithm function to an internet service user based on a plurality of items, the method includes calculating, by a user preference analyzer for each item, a user preference value corresponding to each item of a analysis target service; and storing, by a memory, data related to the each item in a first data format or storing, by the memory, data related to the each item in a second data format with required bits less than the first data format, based on the user preference value of the each item.

According to an embodiment, the calculating of the user preference value may include determining, by the user preference analyzer for the each item, a value representing a frequency of using data related to any one item as the user preference value for a corresponding item when the memory system provides the personalized recommendation algorithm function.

According to an embodiment, the method may further include classifying, by a service item classification unit, items in which the corresponding user preference value among the each item of the analysis target service is equal to or greater than a reference preference value into a first group, and classifying items in which the corresponding user preference value among the each item of the analysis target service is less than the reference preference value into a second group; and changing, by a data format changing unit, a format of data previously stored in the first data format and related to an item belonging to the second group to the second data format.

According to an embodiment, the storing may include storing, by the memory, data related to the item belonging to the first group in the first data format; and storing, by the memory, data related to the item belonging to the second group in the second data format.

According to an embodiment, the method may further include extracting, by an algorithm item extraction unit a plurality of items from the analysis target service by using an artificial intelligence model; generating, by an embedding table generating unit, an embedding table based on the extracted items; and performing, by a personalized recommendation unit, the personalized recommendation algorithm function of recommending personalized recommendation information to the internet service user using the artificial intelligence model based on the embedding table.

According to an embodiment, the extracting of the items may include extracting, by the algorithm item extraction unit, a plurality of learning items from a machine learning service by using an artificial intelligence model, and the generating of the embedding table may include generating, by the embedding table generating unit, a learning embedding table based on the extracted learning items, and the method may further include training, by a machine learning unit, the artificial intelligence model by setting the learning embedding table as an input variable and setting optimal personalized recommendation information as an output variable.

According to an embodiment, the extracting of the item may include extracting, by the algorithm item extraction unit, at least one feature of a genre of the analysis target service, a user age distribution, a user gender distribution, a user residence area, and a user propensity as the item of the analysis target service.

According to an embodiment, the extracting of the items may include periodically extracting, by the algorithm item extraction unit, the plurality of items from the analysis target service at regular intervals, the generating of the embedding table may include updating, by the embedding table generating unit, a pre-generated embedding table for learning based on an additionally extracted item, and the training of the artificial intelligence model may include additionally training, by the machine learning unit, the artificial intelligence model by setting the updated embedding table as an input variable and setting newly updated optimal personalized recommendation information as an output variable.

According to an embodiment, the changing of the format of the data to the second data format may include changing, by the data format changing unit, a format of data previously stored in the first data format and related to the item belonging to the second group to the second data format of a 16-bit data format.

According to an exemplary embodiment, a non-transitory recording medium may store a computer-readable computer program causing a computer to perform executing a method of controlling a memory system to which a heterogeneous data format is applied.

BRIEF DESCRIPTION OF THE FIGURES

The above and other objects and features will become apparent from the following description with reference to the following figures, wherein like reference numerals refer to like parts throughout the various figures unless otherwise specified.

DETAILED DESCRIPTION

Figure 1:
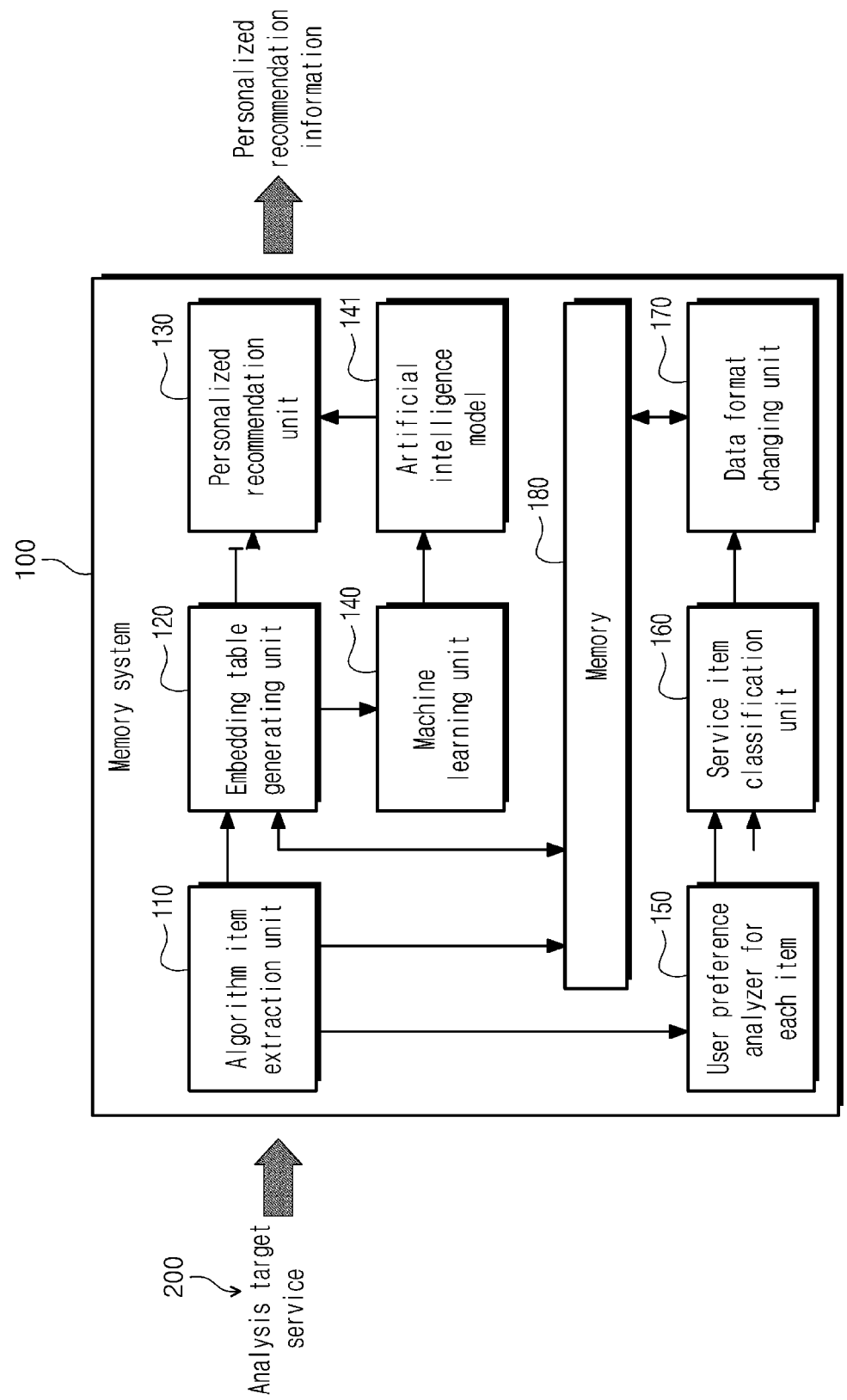
FIG. 1 is a configuration diagram of a memory system according to an embodiment.

The same reference numerals denote the same elements throughout the specification. In the specification, all elements of embodiments are not described, and general contents in the art to which the disclosed disclosure belongs or repeated contents between the embodiments will not be described.

In addition, when a part "includes" an element, another element may be further included, rather than excluding the existence of another element, unless otherwise described.

Terms "first", "second", and the like are used herein to distinguish one element from another element, and the elements are not limited to the terms described above.

As used herein, singular forms "a" and "an" are intended to include plural forms as well, unless the context clearly indicates otherwise.

Reference numerals in operations are used for the sake of convenience of description and do not describe an order of the operations, and the operations may be performed through an order different from the described order unless the context clearly indicates a specific order.

Hereinafter, a principle of action and embodiments of the inventive concept will be described with reference to the accompanying drawings.

FIG. 1 is a configuration diagram of a memory system according to an embodiment.

Referring to FIG. 1, a memory system 100 according to an embodiment of the inventive concept may include an algorithm item extraction unit 110, an embedding table generating unit 120, a personalized recommendation unit 130, a machine learning unit 140, an artificial intelligence model 141, a user preference analyzer 150 for each item, a service item classification unit 160, a data format changing unit 170, and a memory 180.

The memory system 100 may provide a personalized recommendation algorithm function to Internet service users based on a plurality of items. The personalized recommendation algorithm function may be performed by a personalized recommendation system.

This personalized recommendation system is widely used in many Internet services such as e-commerce, social networks, video, etc. Users using Internet services provided with the personalized recommendation algorithm function may receive recommendations for information in fields of interest to themselves through the personalized recommendation algorithm function provided by the personalized recommendation system without directly performing information search such as information search, product search, and desired video or image search.

In summary, any one Internet service may provide various analysis target services 200 to users. The user may receive information on the analysis target service 200 recommended by the personalized recommendation system as personalized recommendation information without having to conduct a search or a search for information by himself.

The personalized recommendation algorithm extracts various items related to the corresponding information from the information of the analysis target service 200, and provides the user with a personalized recommendation information based on the output value using the extracted items and the artificial intelligence model 141 which is trained in advance.

The items that may be extracted from the analysis target service 200 may be at least one of a genre of the corresponding analysis target service 200, age distribution of users of the corresponding analysis target service 200, gender distribution of users of the corresponding analysis target service 200, residence areas of users of the corresponding analysis target service 200, and propensity of users of the corresponding analysis target service 200. However, items extractable from the analysis target service 200 are not necessarily limited thereto.

The algorithm item extraction unit 110, the embedding table generating unit 120, the personalized recommendation unit 130, the machine learning unit 140, the artificial intelligence model 141, the user preference analyzer 150 for each item, the service item classification unit 160, and the data format changing unit 170 may include any one processor among a plurality of processors included in the memory system 100. In addition, a control method of the memory system to which a heterogeneous data format is applied according to embodiments of the inventive concept described so far and embodiments to be described later may be implemented in the form of a program that can be driven by a processor.

In this case, the program may include program commands, data files, data structures, etc. alone or in combination. The program may be designed and made using machine language codes or high-level language codes. The program may be specially designed to implement the above-described code correction method, or may be implemented using various functions or definitions that are known and usable to those skilled in the art in the field of computer software. The program may be recorded into a recording medium readable by a processor for implementing a control method of the above-described memory system. In this case, the recording medium may be the memory 180.

The memory 180 may store a program for performing the above-described operation and an operation to be described later, and the memory 180 may allow the stored program to be executed. When there are a plurality of processors and memories 180, they may be integrated into a single chip or may be provided in physically separate locations.

The memory 180 may be a volatile memory such as a dynamic random access memory (DRAM) for temporarily storing data, but is not limited thereto, and the memory 180 may include a non-volatile memory such as a read only memory (ROM), an erasable programmable read only memory (EPROM), and an electrically erasable programmable read only memory (EEPROM), which store control programs and control data for a long period of time.

Figure 2:
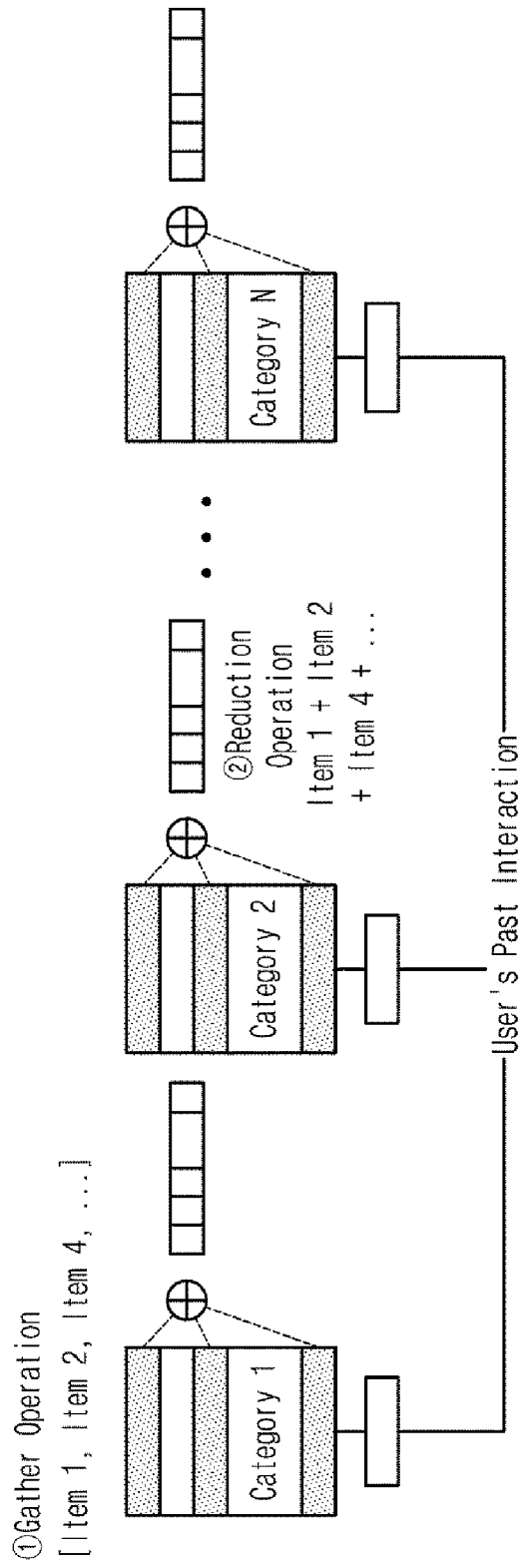
FIG. 2 is a diagram for describing an embedding process according to an embodiment.
Figure 3A:
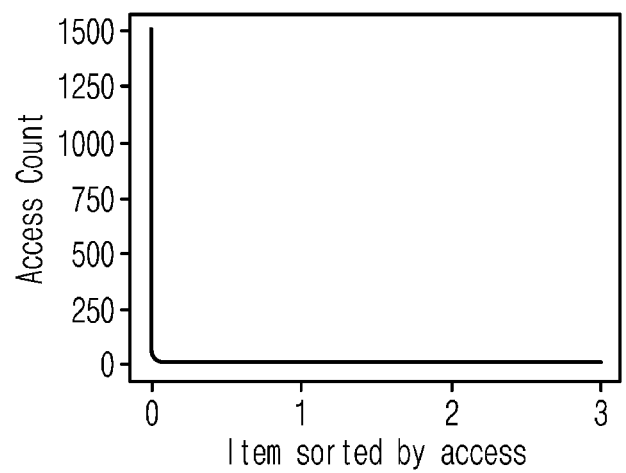
FIGS. 3A to 3F are another diagrams for describing a difference in the frequency of using each item in performing a function of a personalized recommendation algorithm according to an embodiment.
Figure 3B:
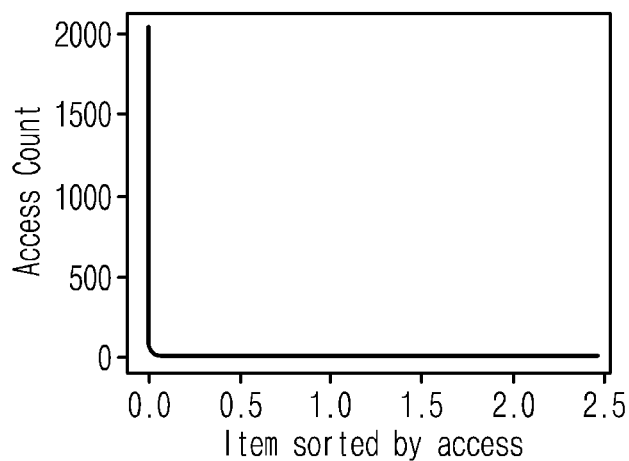
Figure 3C:
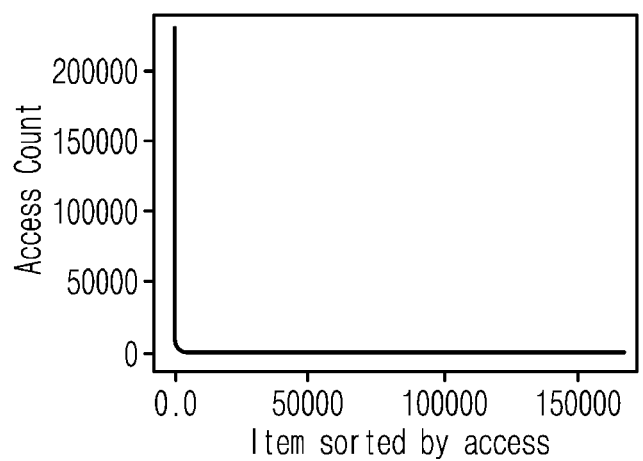
Figure 3D:
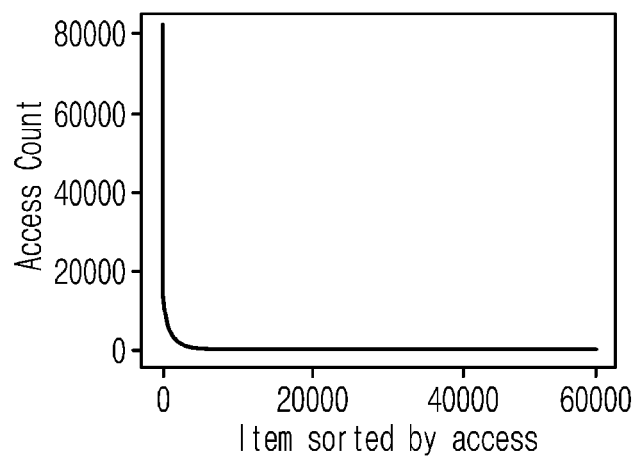
Figure 3E:
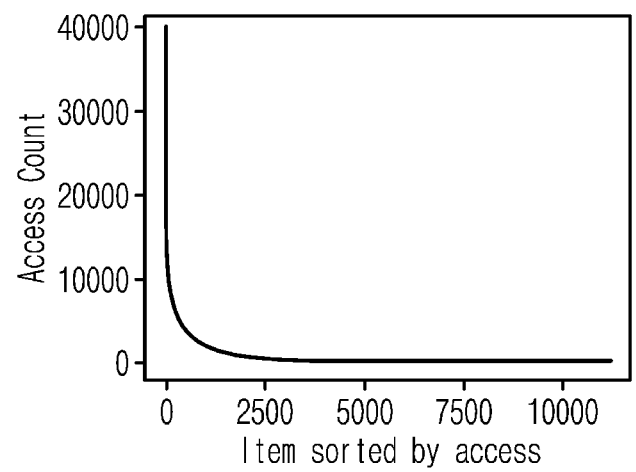
Figure 3F:
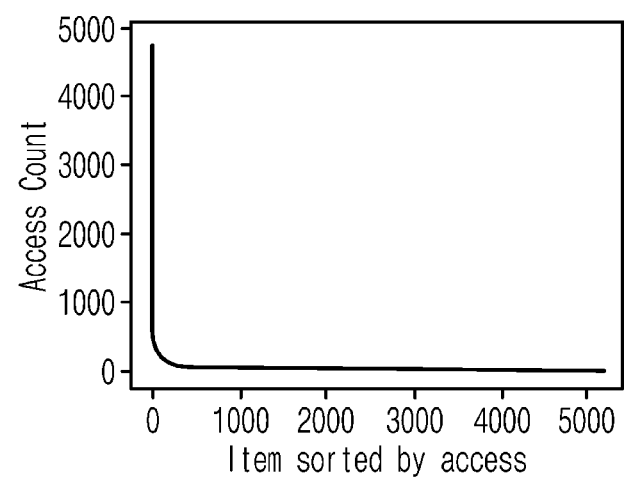

FIG. 2 is a diagram for describing an embedding process according to an embodiment.

Referring to FIG. 2, a process of performing an embedding operation in the process of performing a personalized recommendation algorithm may be confirmed. The embedding operation is one of the calculation processes, and may be a process of gathering tens or more of vector formats that exist for each characteristic value of an item and making one.

The embedding table may be data values in which characteristic values of millions of items related to Internet services are arranged in the form of an array of vectors.

The artificial intelligence system of the personalized recommendation algorithm mainly utilizes an embedding layer, and the embedding layer is greatly affected by the memory bandwidth. Specifically, millions of items are stored in one embedding table to perform an embedding operation, and high bandwidth is required in the process of providing these items to a host processor. Meanwhile, an NMP (Near Memory Processing) or a PIM (Processing In Memory) is being used as a solution to these limitations.

When the NMP is performed using high-bandwidth memory (HBM), which is widely used in applications requiring high bandwidth, since high-throughput calculation is possible, a personalized recommendation system can be accelerated effectively.

The memory 180 according to an embodiment may be implemented as a three-dimensional stacked memory. The three-dimensional stacked memory may be the aforementioned high-bandwidth memory (HBM).

However, since the HBM has a limited capacity compared to conventional memory devices, it is difficult to store an embedding table including millions of items in one stack. Therefore, the memory system 100 capable of effectively storing an embedding table even with a limited capacity is required.

Referring back to FIG. 1, the user preference analyzer 150 for each item may calculate a user preference value corresponding to each item of the analysis target service 200.

The user preference value of each item may be information about how often the corresponding item is used in the process of performing the personalized recommendation algorithm.

That is, when the memory system 100 provides the personalized recommendation algorithm function, the user preference analyzer 150 for each item may determine a value representing a frequency of using data related to a certain item as the user preference value of the corresponding item. In summary, as the user preference value increases, the corresponding item may be a more frequently used item in the personalized recommendation algorithm.

The memory 180 may be configured to store data related to each item in a first data format 301 or to store data related to each item in a second data format 302, based on the user preference value for each item.

The first data format 301 and the second data format 302 may be data formats for how many bits of data can be stored.

In this case, the second data format 302 may be a data format requiring fewer bits than the first data format 301. Therefore, even for the same data, data stored in the second data format 302 may occupy a smaller capacity than data stored in the first data format 301.

That is, storing data related to each item by utilizing both the first data format 301 and the second data format 302 after changing some data to the second data format 302 may be to store data efficiently compared to storing all data related to each item only in the first data format 301. Meanwhile, a criterion for changing data related to a certain item to the second data format 302 may be required.

FIGS. 3A to 3F are another diagrams for describing a difference in the frequency of using each item in performing a function of a personalized recommendation algorithm according to an embodiment.

Referring to FIG. 3A, FIG. 3B, FIG. 3C, FIG. 3D, FIG. 3E and FIG. 3F graphs for each of the Internet map service, Internet bookstore service, Internet record service, Internet movie service, Internet animation service, and Internet game software distribution service may be seen.

Referring to each graph, it may be seen that in the process of performing the embedding operation, although the embedding table is composed of millions of items, the user preference is concentrated only on some items of the table.

For example, even if numerous items such as the genre, the user age distribution, the user gender distribution, and the user residence area of the analysis target service 200 are items that can be extracted from the Internet game software distribution service, only items such as the genre, the user age distribution, the user gender distribution, etc. of the analysis target service 200 are often used to provide the personalized recommendation algorithm function, the remaining items, such as the user's residence area, may be rarely used.

In summary, a user of a specific Internet service, like general users, is provided with the personalized information output by using items frequently used in the personalized recommendation algorithm function of the corresponding Internet service several times again.

Compared to other items, items frequently used in the personalized recommendation algorithm function may be different for each Internet service. For example, in the case of the Internet game software distribution service, the user's residence area is rarely used, but in the case of an Internet map service, the user's residence area may be the most used item.

Therefore, after obtaining the user preference value of each item for each Internet service, by classifying data related to each item into data related to frequently used items and data related to less frequently used items based on the user preference value of each item, and then by storing the data related to each item according to the classification result in a heterogeneous data format with a different required number of bits, performance of the memory system 100 may be improved as a capacity required for storing data related to items that is less used is reduced.

As a result, the control method of the memory system 100 according to an embodiment reduces the size of an embedding table required for a personalized recommendation system to enable the NMP based on the 3D stacked memory, thereby increasing data storage performance compared to conventional memory devices.

Referring back to FIG. 1, the service item classification unit 160 may receive the user preference value calculated from the user preference analyzer 150 for each item.

The service item classification unit 160 may determine whether the user preference value is greater than or equal to a reference preference value.

The reference preference value may be a user preference value that is a criterion for determining which item is an item frequently used in the personalized recommendation algorithm, may be predetermined by the user of the memory system 100, and may be changed later.

For example, when items frequently used in the personalized recommendation algorithm are listed in order of frequency among millions of items, the reference preference value may be a user preference value of items corresponding to the top 20%, but is not necessarily limited to the top 20%, and may later be changed to various figures such as 10% or 30%.

The service item classification unit 160 may classify items having a corresponding user preference value equal to or greater than the reference preference among items of the analysis target service 200 into a first group, and may classify items having a corresponding user preference value less than the reference preference among items of the analysis target service 200 into a second group.

Since the item belonging to the first group is frequently used in the personalized recommendation algorithm, it is not necessarily changed to the second data format 302, which is a low-bit data format, and may still be stored as the first data format 301.

Meanwhile, even data related to items belonging to the second group may initially be previously stored in the first data format 301, similar to data related to items belonging to the first group.

The data format changing unit 170 may change the format of data related to items previously stored in the first data format 301 and belonging to the second group to the second data format 302.

The memory 180 may be configured to store data related to items belonging to the first group in the first data format 301 and data related to items belonging to the second group in the second data format 302.

The algorithm item extraction unit 110 may extract a plurality of items from the analysis target service 200 using the artificial intelligence model 141. That is, the algorithm item extraction unit 110 may receive a plurality of output items by providing feature information extractable from the analysis target service 200 to the artificial intelligence model 141. Accordingly, different items may be extracted depending on which artificial intelligence model 141 is used and how the artificial intelligence model 141 is learned, even for the same analysis target service 200. Meanwhile, the artificial intelligence model 141 may be a deep learning model learned through a machine learning method.

The algorithm item extraction unit 110 may extract at least one characteristic of the genre, the user age distribution, the user gender distribution, the user residence area, and the user propensity of the analysis target service 200 as the item of the analysis target service 200.

The embedding table generating unit 120 may generate an embedding table based on the extracted items.

The personalized recommendation unit 130 may perform a personalized recommendation algorithm function of recommending personalized recommendation information to users of Internet services using the artificial intelligence model 141 based on the embedding table. That is, the personalized recommendation unit 130 may receive the personalized recommendation information output by providing feature information extractable from the embedding table to the artificial intelligence model 141.

On the other hand, to extract a plurality of items or recommend personalized recommendation information according to an embodiment, a process of training the artificial intelligence model 141 through machine learning is required in advance based on data for learning or information for learning and the optimal personalized recommendation information pre-determined as the correct answer.

The algorithm item extraction unit 110 may extract a plurality of learning items from the machine learning service using the artificial intelligence model 141.

The embedding table generating unit 120 may generate an embedding table for learning based on the extracted learning items.

The machine learning unit 140 may train the artificial intelligence model 141 by setting the embedding table for learning as an input variable and optimal personalized recommendation information as an output variable.

On the other hand, it may not be desirable to provide a personalized recommendation algorithm using only the same items always without changing the personalized recommendation system of a specific Internet service. For example, according to the trend change over time or various environmental changes, items that are previously useful for determining the personalized recommendation information may become items that are no longer useful for determining the personalized recommendation information, and the reverse situation may also occur over time. In summary, it is necessary to make the items extracted by the algorithm item extraction unit 110 change according to trends or environmental changes over time.

The algorithm item extraction unit 110 may periodically extract a plurality of items from the analysis target service 200 at regular intervals. In this case, the extraction period may be previously set by the user of the memory system 100.

The embedding table generating unit 120 may update a pre-generated embedding table for learning based on additionally extracted items.

The machine learning unit 140 may additionally train the artificial intelligence model 141 by setting the updated embedding table as an input variable and newly updated optimal personalized recommendation information as an output variable.

That is, the type and frequency of items extracted from the analysis target service 200 may change over time, and accordingly, data of items originally stored in the first data format 301 may be later stored in the second data format 302, or conversely, data of items originally stored in the second data format 302 may be later stored in the first data format 301.

The machine learning unit 140 may train the artificial intelligence model 141 using a method in which a loss function decreases through repetitive machine learning. The pre-learned artificial intelligence model 141 may be stored in the memory 180.

The machine learning may mean using a model composed of multiple parameters and optimizing the parameters with given data. The machine learning may include a supervised learning, an unsupervised learning, and a reinforcement learning depending on a form of a learning issue. The supervised learning is to learn the mapping between inputs and outputs, and may be applied when input and output pairs are given as data. The unsupervised learning is applied when there are only inputs and no outputs, and may find regularities between inputs. However, the machine learning according to an embodiment is not necessarily limited to the aforementioned learning methods.

The machine learning unit 140 may train the artificial intelligence model 141 in various ways. For example, the machine learning unit 140 may train features extracted from a plurality of machine learning services, the analysis target services 200, or an embedding table for learning using a deep learning-based learning method.

In this case, to train how to extract features from the machine learning service, the analysis target services 200, or the embedding table for learning, a convolutional neural networks (CNN) structure in which several convolution layers are stacked may be used. However, the learning method of the machine learning unit 140 is not necessarily limited to a method using the CNN structure.

For example, the machine learning unit 140 may perform machine learning by utilizing a Graph Neural Network (GNN) structure that quickly predicts an optimal topology between computing system components, and the machine learning may use any Artificial Neural Network (ANN).

Figure 4A:
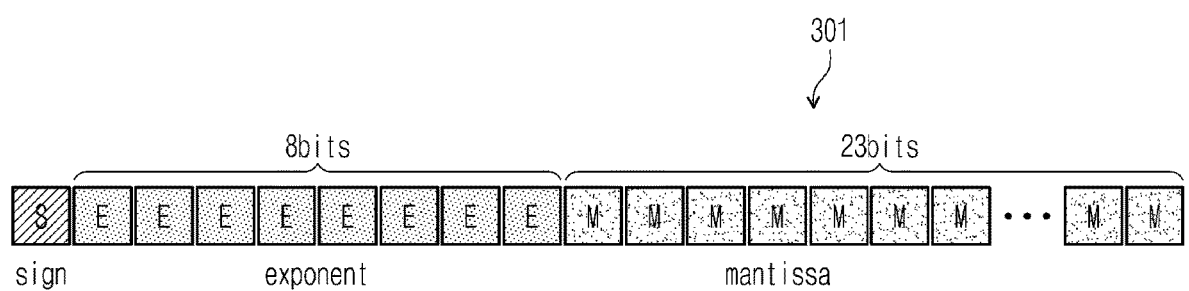
FIGS. 4A and 4B are diagrams for describing a first data format and a second data format according to an embodiment.
Figure 4B:
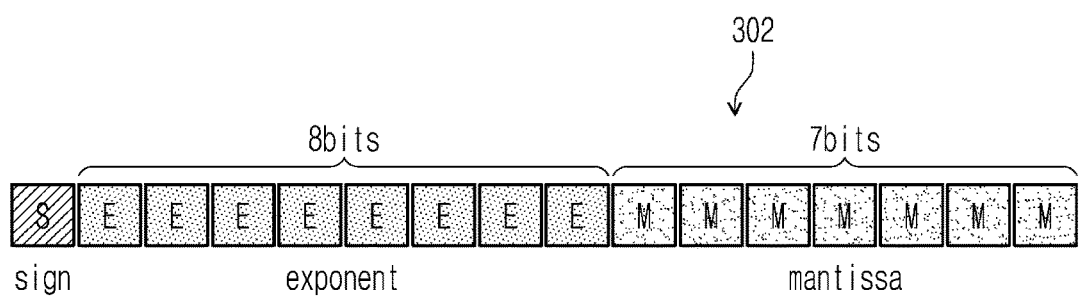

FIGS. 4A and 4B are diagrams for describing a first data format and a second data format according to an embodiment.

Referring to FIG. 4A and FIG. 4B, the first data format 301 may be a 32-bit data format, and the second data format 302 may be a 16-bit data format.

The data format changing unit 170 may change the format of data related to items that are previously stored in the first data format 301 of 32-bit data format and belongs to the second group to the second data format 302 of 16-bit data format. However, the first data format 301 and the second data format 302 are not necessarily limited to the data format of the above described size, when the size of the second data format 302 is less than the size of the first data format 301, and when the data format of the first data format 301 is changeable to the data format of the second data format 302, a data format of any size can be changed to the first data format 301 and the second data format 302.

In detail, the first data format 301 may be a data format of FP32, which is a data format for maximizing the precision of embedding. In contrast, the second data format 302 may be a data format of BFLOAT16, which is a data format for reducing the size of embedding by half.

Both the FP32 data format and the BFLOAT16 data can represent any number in binary. In this case, both formats are composed of an exponent indicating a range of values that can be expressed and a mantissa indicating an actual value.

In this case, mantissas indicating the actual value of the value that can be represented in the two formats may be different. As a result, the FP32 data format, which has a larger mantissa representing the actual value, may be able to express more accurately than the BFLOAT16 data format. However, the exponent of values that can be expressed in both the FP32 data format and the BFLOAT16 data format is the same to each other.

For example, since the mantissa representing the actual value of the FP32 format is 23 bits, and the mantissa representing the actual value of the BFLOAT16 format is 7 bits, the FP32 format may be able to express values more accurately than the BFLOAT16 format. However, since the format of FP32 and the format of BFLOAT16 have the same exponent of 8 bits, the accuracy of the two data formats for specific data is different, but the expressible range may be the same.

In this way, when the first data format 301 is a data format of FP32 and the second data format 302 is a data format of BFLOAT16, since the expressible range of the first data format 301 are the same as the expressible range of the second data format 302, it may be possible to change the format of data originally stored in the first data format 301 to the second data format 302. In this case, the expression accuracy of the data changed to the second data format 302 is lowered, but as a result, the memory system 100 according to an embodiment can reduce the capacity required to store relatively less used data, and thus the performance of the memory system 100 may be improved by easily utilizing the high-bandwidth memory (HBM).

Figure 5:
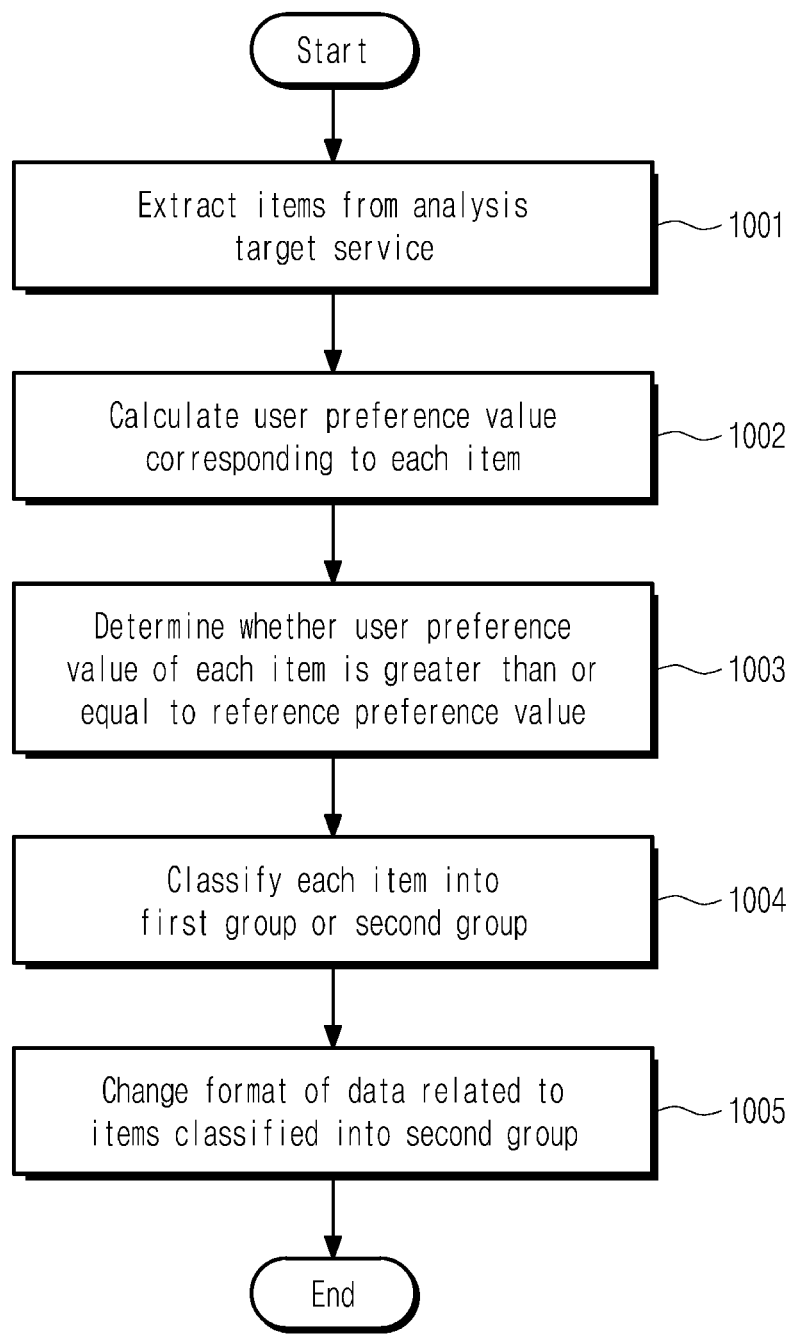
FIG. 5 is a flowchart of a method for controlling a memory system according to an embodiment.

FIG. 5 is a flowchart of a method for controlling a memory system according to an embodiment. This is only a preferred embodiment for achieving the object of the inventive concept, and some components may also be added or omitted as needed.

Referring to FIG. 5, the algorithm item extraction unit may extract a plurality of items from the analysis target service 200 using the artificial intelligence model 141 (1001).

The user preference analyzer 150 for each item may calculate a user preference value corresponding to each item of the analysis target service 200 (1002). In this case, when the memory system 100 provides the personalized recommendation algorithm function, the user preference analyzer 150 for each item may determine a value representing a frequency of using data related to a certain item as the user preference value of the corresponding item.

The service item classification unit 160 may determine whether the user preference value is greater than or equal to a reference preference value (1003).

The service item classification unit 160 may classify items having a corresponding user preference value equal to or greater than the reference preference among items of the analysis target service 200 into a first group, and may classify items having a corresponding user preference value less than the reference preference among items of the analysis target service 200 into a second group (1004).

The data format changing unit 170 may change the format of data related to items previously stored in the first data format 301 and belonging to the second group to the second data format 302 (1005).

To verify the performance of the method according to an embodiment of the inventive concept, an experiment was conducted.

Figure 6:
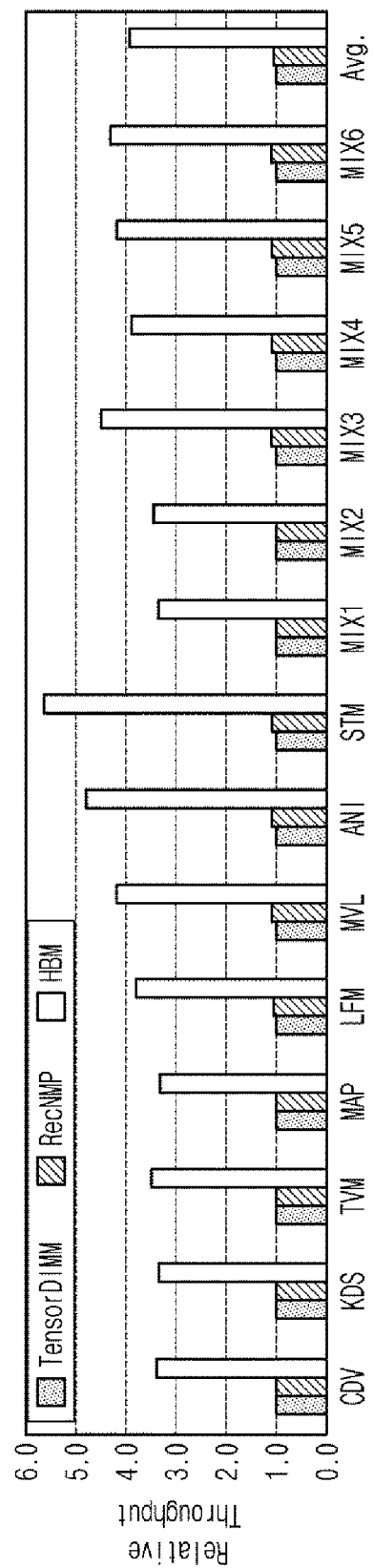
FIG. 6 is a graph illustrating a degree of improvement of a memory system according to an embodiment compared to a conventional memory system.

FIG. 6 is a graph illustrating a degree of improvement of a memory system according to an embodiment compared to a conventional memory system.

Referring to FIG. 6, it can be seen that the performance of the memory system 100 according to an embodiment is improved compared to that of the conventional memory system with respect to each of Internet map service, Internet bookstore service, Internet music service, Internet movie service, Internet animation service, and Internet game software distribution service.

Specifically, conventional memories perform operations using a Tensor DIMM (Dual In Memory Module) or RecNMP method. However, in the case of the high-bandwidth memory (HBM) that can be utilized as a result of reducing the required memory capacity according to an embodiment compared to the conventional method, it may be seen that relative throughput is improved compared to other methods.

This is because about 78% of the numerous items are stored in a heterogeneous data format according to an embodiment and then use only half the capacity, and this result occurs because the reconstructed embedding table uses only 60.9% of the capacity compared to the conventional method.

According to an exemplary embodiment, by reducing the size of an embedding table to enable the NMP based on the 3D stacked memory, it is possible to obtain a high performance gain compared to the existing DIMM based NMP structure.

In addition, according to an exemplary embodiment, through algorithm reconstruction technology obtained through the NMP optimization and characteristics of algorithms related to personalized recommendation systems provided by Internet services, it is possible to utilize the 3D stacked memory that enables rapid utilization of the NMP and the PIM even in a new type of application showing a similar pattern.

As described above, the disclosed embodiments have been described with reference to the accompanying drawings. Those skilled in the art to which the inventive concept pertains will be understood that the inventive concept can be implemented in a form different from the disclosed embodiments without changing the technical spirit or essential features of the inventive concept. The disclosed embodiments are illustrative and should not be construed as limiting.

What is claimed is:

1. A memory system providing a personalized recommendation algorithm function to an internet service user based on a plurality of items, the memory system comprising:
   a user preference analyzer for each item configured to calculate a user preference value corresponding to each item of an analysis target service;
   a memory configured to store data related to the each item in a first data format or to store data related to the each item in a second data format with required bits less than the first data format, based on the user preference value of the each item;
   an algorithm item extraction unit configured to extract a plurality of items from the analysis target service by using an artificial intelligence model;
   an embedding table generating unit configured to generate an embedding table based on the extracted items; and a personalized recommendation unit configured to perform the personalized recommendation algorithm function using the artificial intelligence model based on the embedding table, and to provide optimal personalized recommendation information to the internet service user, wherein the algorithm item extraction unit is configured to extract a plurality of learning items from a machine learning service using the artificial intelligence model, wherein the embedding table generation unit is configured to generate a learning embedding table based on the extracted learning items, wherein the memory system further comprises a machine learning unit configured to train the artificial intelligence model by setting the learning embedding table as an input variable and setting the optimal personalized recommendation information as an output variable.

2. The memory system of claim 1, wherein the user preference analyzer for the each item is configured to:
determine a value representing a frequency of using data related to any one item as the user preference value for a corresponding item.

3. The memory system of claim 1, further comprising:
a service item classification unit configured to classify items having user preference values being equal to or greater than a reference preference value into a first group, and to classify items having user preference values being less than the reference preference value into a second group; and
a data format changing unit configured to change a format of data previously stored in the first data format and related to an item belonging to the second group to the second data format.

4. The memory system of claim 3, wherein the memory is configured to:
store data related to the item belonging to the first group in the first data format; and
store data related to the item belonging to the second group in the second data format.

5. The memory system of claim 1, wherein the algorithm item extraction unit is configured to:
extract at least one feature of a genre of the analysis target service, a user age distribution, a user gender distribution, a user residence area, and a user propensity as the item of the analysis target service.

6. The memory system of claim 1, wherein the algorithm item extraction unit is configured to:
periodically extract the plurality of items from the analysis target service at regular intervals,
wherein the embedding table generating unit is configured to:
update a pre-generated embedding table for learning based on an additionally extracted item, and
wherein the machine learning unit is configured to:
additionally train the artificial intelligence model by setting the updated embedding table as an input variable and setting newly updated optimal personalized recommendation information as an output variable.

7. The memory system of claim 1, wherein the memory is implemented with a three-dimensional stacked memory.

8. The memory system of claim 3, wherein the data format changing unit is configured to:
change a format of data previously stored in the first data format of a 32-bit data format and related to the item belonging to the second group to the second data format of a 16-bit data format.

9. A method of controlling a memory system providing a personalized recommendation algorithm function to an internet service user based on a plurality of items, the method comprising:
calculating, by a user preference analyzer for each item, a user preference value corresponding to each item of an analysis target service;
storing, by a memory, data related to the each item in a first data format or storing, by the memory, data related to the each item in a second data format with required bits less than the first data format, based on the user preference value of the each item;
extracting, by an algorithm item extraction unit, a plurality of items from the analysis target service by using an artificial intelligence model;
generating, by an embedding table generating unit, an embedding table based on the extracted items; and
performing, by a personalized recommendation unit, the personalized recommendation algorithm function using the artificial intelligence model based on the embedding table and providing optimal personalized recommendation information to the internet service user,
wherein the extracting a plurality of items includes extracting, by the algorithm item extraction unit, a plurality of learning items from a machine learning service by using an artificial intelligence model,
wherein the generating an embedding table includes generating, by the embedding table generating unit, a learning embedding table based on the extracted learning items,
wherein the method further comprises training, by a machine learning unit, the artificial intelligence model by setting the learning embedding table as an input variable and setting the optimal personalized recommendation information as an output variable.

10. The method of claim 9, wherein the calculating of the user preference value includes:
determining, by the user preference analyzer for the each item, a value representing a frequency of using data related to any one item as the user preference value for a corresponding item.

11. The method of claim 9, further comprising:
classifying, by a service item classification unit, items having user preference values being equal to or greater than a reference preference value into a first group, and classifying items having user preference values being less than the reference preference value into a second group; and
changing, by a data format changing unit, a format of data previously stored in the first data format and related to an item belonging to the second group to the second data format.

12. The method of claim 11, wherein the storing includes:
storing, by the memory, data related to the item belonging to the first group in the first data format; and
storing, by the memory, data related to the item belonging to the second group in the second data format.

13. The method of claim 9, wherein the extracting of the items includes:
extracting, by the algorithm item extraction unit, at least one feature of a genre of the analysis target service, a user age distribution, a user gender distribution, a user residence area, and a user propensity as the item of the analysis target service.

14. The method of claim 9, wherein the extracting of the items includes:

periodically extracting, by the algorithm item extraction unit, the plurality of items from the analysis target service at regular intervals, wherein the generating of the embedding table includes:

updating, by the embedding table generating unit, a pre-generated embedding table for learning based on an additionally extracted item, and wherein the training of the artificial intelligence model includes:

additionally training, by the machine learning unit, the artificial intelligence model by setting the updated embedding table as an input variable and setting newly updated optimal personalized recommendation information as an output variable.

15. The method of claim 11, wherein the changing of the format of the data to the second data format includes:

changing, by the data format changing unit, a format of data previously stored in the first data format of a 32-bit data format and related to the item belonging to the second group to the second data format of a 16-bit data format.

16. A non-transitory recording medium storing a computer-readable computer program, the computer-readable computer program causing a computer to perform executing the method of controlling the memory system of claim 9.

* * * * *